Oct. 22, 1957  A. SZAYNA  2,810,665
METHOD OF CLEANING EQUIPMENT FOULED WITH LATEX COAGULUM
Filed Feb. 17, 1955
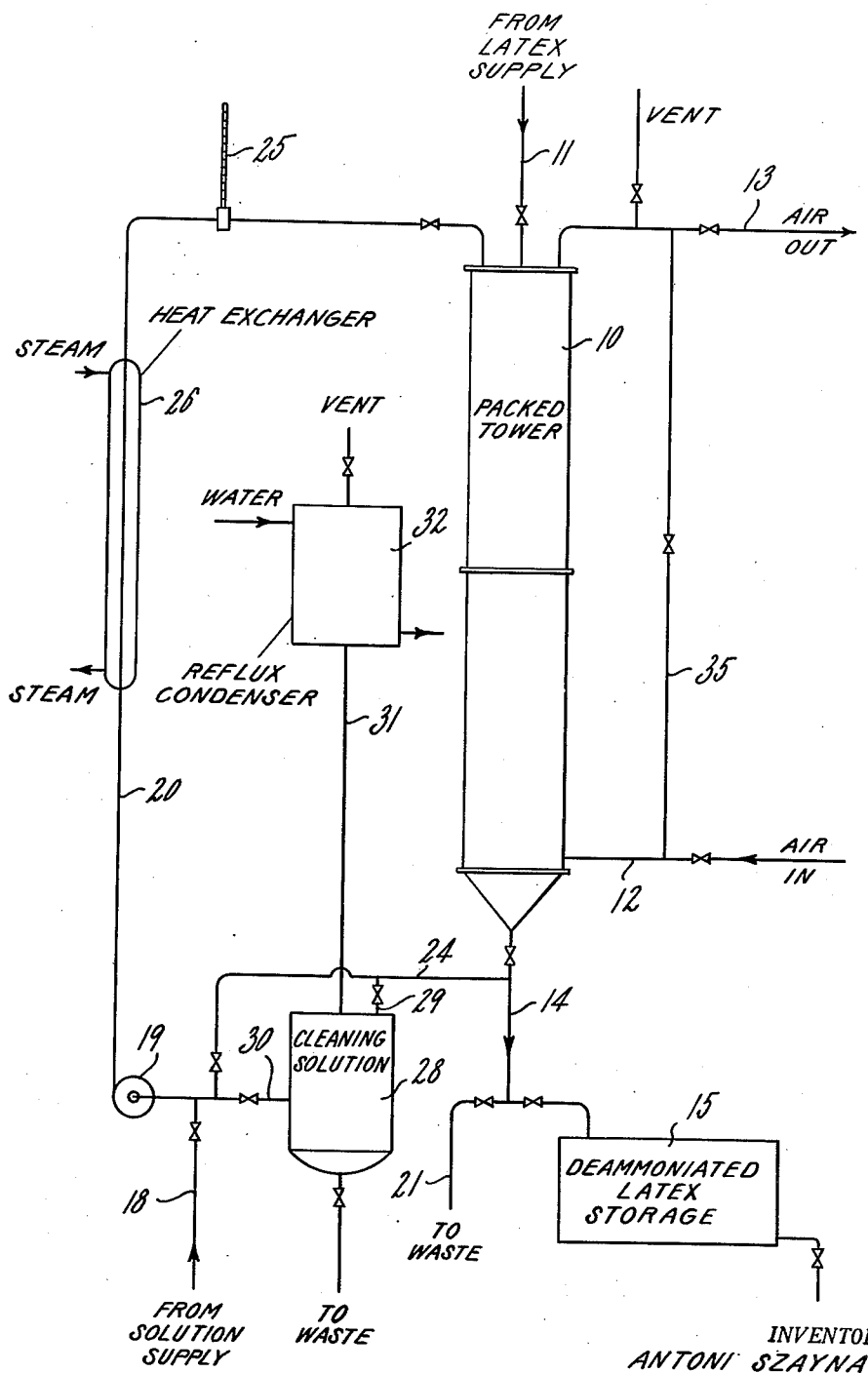
INVENTOR.
ANTONI SZAYNA
BY James J. Long
AGENT

United States Patent Office 2,810,665
Patented Oct. 22, 1957

2,810,665

METHOD OF CLEANING EQUIPMENT FOULED WITH LATEX COAGULUM

Antoni Szayna, Passaic, N. J., assignor to United States Rubber Company, New York, N. Y., a corporation of New Jersey Application February 17, 1955, Serial No. 488,931

9 Claims. (Cl. 134—2)

This invention relates to a method of cleaning equipment used for handling or processing rubber latex, and more particularly it relates to a method of removing from such equipment deposits of rubber or coagulum which accumulate therein over a period of time.

Autoclaves, tanks, packed towers, pipes, and the like, in which rubber latex, whether natural or synthetic, is processed or stored tend to acquire gradually over a more or less prolonged period of service an accumulation of coagulated rubber which interferes with the proper and efficient use of the equipment and which is usually exceedingly difficult to remove by previously known methods since it is frequently quite tough and tenaciously adherent to the surfaces of the equipment and is not easily accessible.

Accordingly, the principal object of the present invention is to afford a more convenient, economical, and effective way of removing rubber coagulum from equipment so fouled or contaminated.

The invention will be described in detail with reference to the accompanying drawing, the single figure of which shows, in a purely diagrammatic elevational view, a packed tower for processing rubber latex, with auxiliary equipment for cleaning or defouling such tower in accordance with a preferred method of the invention.

Referring to the drawing, the apparatus includes a packed tower 10 containing Raschig rings or other packing, which is designed for use in a countercurrent deammoniation process described in copending application Serial No. 469,364, filed November 17, 1954, of A. Szayna and E. Hazell. In such process, rubber latex (ordinarily Hevea latex) containing ammonia as a preservative is introduced at the top of the tower 10 through a suitable line 11. The purpose of the process, as described in more detail in the above patent, is to remove the bulk of the ammonia from the latex to render it more suitable for subsequent compounding and use. The ammonia was originally put into the latex for the purpose of preserving it during shipment and storage, in accordance with well-known practice. While the latex is flowing down through the tower, a countercurrent of moisture-saturated air or other suitable gas is passed upwardly; such air is introduced at the bottom of the tower through a line 12, and removed at the top of the tower through a line 13 with the ammonia that was removed from the latex contained therein. The arrangement is such that the ammonia diffuses out of the downwardly passing latex, contained in the form of a thin film of extended surface area on the surface of the packing in the tower, into the countercurrently passing stream of air, which thus serves to sweep the ammonia out of the latex. The thus deammoniated latex is removed at the bottom of the tower through a line 14 and received in a suitable storage vessel 15.

Under the usual conditions of operation small quantities of the latex tend to coagulate on the surface of the packing and the coagulum gradually increases over a period of time, finally reaching a point where the tower becomes so fouled that it can no longer be operated efficiently, and the deammoniation process must then be discontinued for the purpose of cleaning out the coagulated rubber in accordance with the method of the invention.

The deposited rubber is observed to have two distinct forms, one of which is of soft, buttery consistency and which is easily removable or dissolved, and the other of which consists of tougher, stringy agglomerates of true coagulum that it is exceedingly difficult to get rid of. It is to the latter form of deposit that the cleaning method of the invention is particularly directed. In accordance with a preferred practice the softer buttery deposits are removed at fairly frequent intervals, thereby making it possible to operate the tower for a comparatively long period of time without resorting to a major cleaning process to remove the tough, stringy coagulum. The buttery deposits of rubber are typically controlled by temporarily interrupting the deammoniation process, and introducing a dilute aqueous solution of an aqueous alkali through an inlet line 18 with the aid of a circulating pump 19 that delivers the alkaline solution through a line 20 leading to the top of the tower. The alkaline solution flows down through the tower and loosens and dissolves the buttery deposits, and is discharged to waste through a line 21 after passing from the bottom of the tower, or is recycled as described herein below. Typical examples of aqueous solutions suitable for this purpose are: 0.5% KOH; 0.25% NaOH; 0.5% $K_2CO_3$; 0.25% KOH and 0.25% potassium oleate; 0.25% NaOH and 0.25% of an alkyl-aryl sodium sulfonate. This quick flushing prolongs the intervals between the thorough cleaning operation required when the accumulation of the true coagulum becomes excessive. In ordinary practice, such flushing with aqueous alkali is carried out about every two weeks.

The more difficultly removable true coagulum from Hevea latex is composed mainly of rubber with a high gel content. It is insoluble in any of the usual solvents. Hydrocarbon solvents swell it but they do not dissolve it unless the gel is also broken down by milling or similar mastication. We have found that these gel particles (true coagulum) cannot be removed from the packing by alkalis or soap solutions or by hydrocarbons (like benzene, toluene or petroleum naphtha) or by combination of these, whether applied at room temperature or at boiling temperatures.

We have now found, unexpectedly, that the removal of the coagulum from the tower or other equipment is easily accomplished "in situ" with the aid of a chemical softener for rubber, contained in a rubber solvent, and applied in the presence of available oxygen, preferably at elevated temperature and preferably with mechanical agitation.

The chemical softeners for rubber employed in the invention constitute a known class of materials that are sometimes referred to as "peptizers," and also as pro-oxidants, or oxidation catalysts. Among the known peptizers or promoters of chemical plasticization of rubber may be mentioned the mercaptans, e. g. xylyl mercaptan, beta-naphthyl mercaptan and the tertiary mercaptans in general, hydrazines such as phenylhydrazine, nitroso compounds such as para-nitroso-dimethylaniline, azo compounds such as para-hydroxyazobenzene, thiazoles such as mercaptobenzothiazole, and aryl sulfides such as di-ortho-benzamidophenyl disulfide. Many other chemical softeners or peptizers are described in the literature and all are useful in the invention. The commercially available chemical softeners such as those sold under such trade names as Peptizer P-12 or Bondogen may be used. Phenylhydrazine is the preferred softener. In our process they are generally used in concentrations of from about 0.5 to about 5%, on the weight of the solvent, higher concentrations being unnecessary and uneconomical.

The solvents employable in the invention include all solvents for rubber and their mixtures, including hydrocarbons, chlorohydrocarbons and ethers, such as benzene, xylene, tetrahydronaphthalene, decahydronaphthalene, turpentine, gasoline, petroleum and coal tar naphthas of boiling range from 50° to 200° C., 80° to 110° C., or 130° to 180° C., kerosene, chloroform, carbon tetrachloride, and diisopropyl ether, as well as carbon disulfide and other rubber solvents.

A trace of oxygen is supplied in the form of air or gaseous oxygen or in the form of a peroxy compound, examples being hydrogen peroxide, organic peroxides and hydroperoxides (e. g., benzoyl peroxide, cumene hydroperoxide) sodium perborate and other highly oxidized or oxygenated inorganic salts such as ferric salts, bichromates, permanganates, and the like (e. g., ferric sulfate, sodium bichromate, and potassium permanganate). These are used at least in traces (e. g., 0.01%) or in amounts up to 1 or 2% or more of the weight of the solvent.

The cleaning process is facilitated by employing elevated temperatures, preferably between 40° and 180° C. Higher temperatures, e. g., 200° C., may also be employed especially when operating under pressure. Lower temperatures, e. g., 20° C., may be used but require longer cleaning times.

Mechanical action of the solution on the gel particles accelerates the cleaning process. Such mechanical action may be exerted in various ways, for example by: (a) refluxing the solution, in which case the reflux leaches the coagulum, or (b) filling the tower with the solution and bubbling in air from the bottom of the tower, or (c) pumping the solution continuously from the bottom to the top of the tower, and (d) stirring, in the case of autoclaves or tanks. The apparatus shown in the drawing is especially adapted to method (c). A suitable volume of the cleaning liquid is introduced through the line 18 and by means of the pump 19 it is passed through the line 20 to the top of the tower, whence it flows down over the packing, acting on the coagulum therein, and back by a return line 24 leading from the bottom of the tower to the pump 19, and in this manner is continually recirculated as long as required. The thus-circulated cleaning liquid may be heated to a desired temperature, as observed on a thermometer 25, by means of a suitable heater 26 contained in the line 20. At the conclusion of the cleaning, the liquid may be discharged through the waste line 21 by proper manipulation of the valves.

When the volume of the cleaning liquid is large, as may be the case particularly when the cleaning liquid takes the form of an emulsion as will be described in more detail below, the system preferably includes a solution vessel 28 connected at its upper portion to the cleaning liquid return line 24 by a line 29 and at its lower portion to the inlet side of the pump 19 by a line 30. This arrangement is particularly useful when the amount of rubber coagulum to be removed is excessive. The circulatory cleaning liquid passes through the solution vessel 28, and chunks of coagulum loosened from the packing tend to settle to the bottom of such vessel. A breather line 31 which is open to the atmosphere is also connected to the top of the solution vessel 10. A reflux condenser 32 may be included in the breather line.

Air is readily circulated from the top to the bottom of the tower during the cleaning with the aid of the air inlet and outlet lines 12, 13, and a by-pass line 35 which connects to the inlet and outlet lines. This circulation is small and is caused by the rapid downward flow of the liquid in the tower which acts somewhat similarly to a jet pump. This arrangement brings air containing the desired oxygen into contact with the cleaning liquid containing a chemical softener and thus accomplishes the breakdown of the rubber gel. Examples of effective defouling solutions which may be used in such a procedure are as follows:

SOLUTION A

| | Parts |
|---|---|
| Petroleum naphtha, boiling range 100–130° C. | 200 |
| Toluene | 100 |
| Phenylhydrazine | 3 |

SOLUTION B

| | Parts |
|---|---|
| Cracked petroleum heavy naphtha, boiling range 150–180° C. | 100 |
| Xylyl mercaptan | 2 |

These and similar defouling solutions also give satisfactory results when refluxed in a fouled tower especially when the solvents used have a narrow boiling range. Solvents boiling above about 80° C. and up to as high as about 200° C. are especially suitable. The refluxing of the solution in the tower may be done in any convenient way; e. g., by connecting the bottom of the packed tower to be defouled with a closed, heated vessel containing the solution, and boiling this solution. The vapors ascend the tower and are condensed in a vertical condenser on the top of the tower. The condensate flows back over the fouled packing the full length of the tower. Such refluxing is preferably preceded by flushing the tower with dilute aqueous alkali in order to remove the buttery deposits and leave only the true coagulum in the tower, as indicated previously.

Such sequence of operations permits the use of only a relatively small amount of solvent. The amount of solvent used depends upon the size of the tower and on how badly the tower is fouled. At least fifteen parts of solvent per one part of coagulum has to be used, but twenty to fifty parts of the solvent are preferable.

As mentioned above, the cleaning liquid may also take the form of an emulsion. This permits the highest economy of solvent, since the solvent, containing a large proportion of rubber, may be separated from the emulsion and utilized as a rubber cement, or may be recovered for re-use by steam distillation, or by any other known method. In such emulsions the proportion of solvents may vary from 5% to 50%, and is preferably in the range of 10% to 25%, of the total weight of water and solvents. Any known emulsifying agent may be employed to effect the emulsification of the solvent in the water. The various known detergents and soaps are useful, and the emulsion may sometimes advantageously also include an alkali. The amount of emulsifying agent present may be quite small, even less than that ordinarily required to produce a stable emulsion, since the mixture may be kept in a state of satisfactory dispersion by the mechanical agitation performed in the cleaning process. Cleaning solutions A and B shown previously may be mixed with water and an emulsifier and used as emulsions in the previously described re-cycle-pumping method of cleaning packed towers, or for cleaning other vessels. Other examples of effective emulsions are as follows:

EMULSION C

| | Parts |
|---|---|
| Benzene | 100 |
| Phenylhydrazine | 5 |
| Water | 900 |
| "Daxad 11" (sodium salt of an alkylaryl sufonate) | 2 |
| Sodium hydroxide | 2 |

This emulsion is used at 50° to 60° C. and does not foam much. The emulsion separates into two phases on standing, but when it is used in the pumping-recirculating method it gives very good service, i. e., it removes the coagulum from a packed tower in a few hours.

EMULSION D

| | Parts |
|---|---|
| Tetralin (tetrahydronaphthalene) | 300 |
| Pepton 22 (2,2'-dithiobisbenzanilide) | 10 |
| Water | 1200 |
| Potassium oleate | 3 |
| Sodium silicate | 3 |

Emulsion D is used at 80° to 100° C. It foams when pumped through a packed tower. This emulsion may be used also in cleaning autoclaves or other closed vessels, and piping. Such cleaning is facilitated by: (1) application of temperatures above 100° C.; e. g., 120° to 150° C.; (2) having the system under pressure; and (3) stirring the content of the vessel.

Air is easily whipped into the emulsion to assure the presence of a small amount of oxygen. Instead of air, a small amount of available oxygen in the form of potassium persulfate or other oxidizing agent, as disclosed above, may be added at intervals.

It will be understood that the amount of the solution or emulsion to be recirculated is chosen according to the size of the tower to be defouled, the minimum being an amount sufficient to keep the pump submerged while the recirculation of the solution is going on. The rate of pumping should be kept rather high, say 5 to 40 gallons per minute per square foot of tower cross-sectional area. This rate, however, is not critical and may be slower, especially with copiously foaming emulsions. It is desired to emphasize that at high rates of pumping, two phenomena, decidedly advantageous, have been observed, as noted previously. First, the liquid flowing down the tower has a mechanical shearing action which disintegrates the gel more quickly; and second, the liquid exerts on the air in the tower an action comparable to the action of a jet pump. The air is carried down the tower and, when permitted to escape from near the bottom of the tower, through a separate line into the top of the tower, it recirculates. Even very slow movement of the air is effective in securing quick and efficient defouling.

The following examples further illustrate the invention.

Examples of operation

EXAMPLE I

A glass tower of 3 inches inner diameter, packed to a height of 62 inches with half-inch porcelain Raschig rings, was fouled heavily with latex coagulum and buttery latex deposits. Five liters of an aqueous solution containing 0.25% of caustic soda and 0.25% of soap were poured, in five about equal portions, through this tower. The greater part of the contaminants was removed, especially the buttery deposits. What remained was a stringy mass of rubber containing about 80% gel, insoluble in hot benzene.

In order to remove this rubber gel, the tower was filled with an emulsion composed of coal tar naphtha 200 parts, phenylhydrazine 30 parts, water 900 parts, sodium alkylarylsulfonate 3 parts, and caustic soda 2 parts. The emulsion was kept at the temperature of 60° to 75° C. while air was bubbled slowly into the tower through the bottom. After six hours the emulsion was drained off and the tower was flushed with water. The tower was found to be clean, all coagulum having been removed.

EXAMPLE II

The same tower as in Example I became heavily fouled over a period of about six weeks' operation. In this period it was partially cleaned three times, by flushing with an aqueous solution of potassium hydroxide or a solution of caustic soda and soap, but at the end of six weeks there was an excessive amount of true rubber coagulum deposited on the packing and the throughput of the tower was affected. Therefore, after the usual flushing with alkali, a three-liter heated vessel was attached to the bottom of the tower and was filled with an emulsion of 300 cc. of heavy petroleum naphtha, 50 cc. of benzol, 10 g. of phenylhydrazine, 2,000 cc. of water, 5 g. of soap, and 3 g. of sodium hydroxide. This emulsion, heated to 50–60° C., was taken up by a centrifugal pump and delivered, along with air, into the top of the tower at a rate of about 75 gal. per hour. The ensuing recirculation was continued for three hours and a perfect defouling of the tower was accomplished. Visual observation indicated that a far advanced cleaning had been achieved in 1.5 hours.

EXAMPLE III

In order to compare various modes of cleaning a fouled tower, about 1.5 gallons of ½-inch Raschig rings, heavily fouled with coagulated latex, were removed from a tower used for deammoniation of Hevea latex. These Raschig rings were divided into seven lots and charged into towers of 1.5-inch diameter. Various methods of cleaning were used, air being supplied also in each case, with the results shown in the table below:

*Effect of various methods of defouling a tower*

| Defouling Fluid | Method of Application | Temp., degrees | Duration (hrs.) | Result |
|---|---|---|---|---|
| Benzene | Refluxing | 80 | 14 | Not clean; gel swollen. |
| Benzene+Phenylhydrazine | do | 80 | 7 | Clean; small specks of salts. |
| Benzene | Pumping | 25 | 14 | Not clean. |
| Benzene+Phenylhydrazine | do | 25 | 14 | Do. |
| Do | do | 50–60 | 3 | Clean; small specks of salts. |
| Benzene Emulsion | do | 50–60 | 7 | Not clean; gel swollen. |
| Benzene Emulsion+Phenylhydrazine | do | 50–60 | 4 | Clean, perfect. |

EXAMPLE IV

A stainless steel tower, 8 inches in diameter and 10 feet high, packed with 1-inch porcelain Raschig rings, became heavily fouled with coagulated latex in the course of a continuous treatment of latex. At the beginning of the latex treatment the tower was clear, the resistance to the flow of latex and gas, measured as the backpressure in inches of water, being 1.5 inches. As the operation progressed, the backpressure rose to about 6 inches of water. At that point the tower was flushed with an aqueous solution of 0.3% potassium carbonate and 0.2% potassium oleate, and then ten gallons of an emulsion were pumped (recycled) through the tower at a rate of about 4 gal. per minute and at a temperature of 60° to 80° C. The composition of the emulsion was: cracked petroleum naphtha (boiling range 120° to 220° C.) 150 parts, phenylhydrazine 6 parts, water 840 parts, "Daxad 11" 1 part, soap 1 part, sodium silicate 1 part, and caustic soda 2 parts. The re-cycling, which lasted nearly 8 hours and produced a clean tower (including packing), was performed by the apparatus diagrammatically illustrated in the drawing.

Other arrangements aimed at cleaning vessels fouled with coagulated latex by means of mixtures of liquids comprising a solvent and a pro-oxidant "softener" are within the scope of our invention. Thus, an autoclave equipped with a heating device and a stirrer may be cleaned by charging it with my cleaning liquids, heating it under pressure in the presence of available oxygen, and stirring. Here again, gasoline of wide boiling range may be used as the solvent and may be heated up to about 200° C. to effect a quick cleaning. The amount of air present in such a closed system is usually sufficient to enable breakdown of the rubber gel. Stirring helps both in the mechanical action of cleaning and in better contacting of the liquid with the oxygen of the air. We have found it advantageous in cleaning autoclaves and other similar vessels to use strongly foaming emulsions. Therefore, in these cases we add more soap to the emulsions shown in examples supra.

Insulated pipes fouled inside with coagulum may be cleaned easily, provided the cleaning emulsion may be pumped through them.

It will be understood that the duration of the defouling or cleaning operation depends on many factors, such as, degree of fouling, temperature of defouling, intensity of mechanical shearing action, quantity and composition of the cleaning liquid, etc. A packed tower fouled with coagulated latex is usually cleaned in two to eight hours, but when thick lumps of high-gel rubber are present, it may take longer.

Having thus described my invention, what I claim and desire to protect by Letters Patent is:

1. A method of cleaning equipment used for rubber latex, that has become contaminated by deposits of coagulum, comprising subjecting such coagulum to the action of a rubber solvent containing a small amount of a pro-oxidant softener for rubber in the presence of available oxygen, at an elevated temperature.

2. A method as in claim 1, in which the said solvent is agitated in contact with the said coagulum.

3. A method as in claim 1, in which the said solvent is continuously circulated through the said equipment.

4. A method as in claim 1, in which the said solvent is heated to boiling below said equipment and the vapors of the solvent are passed upwardly through said equipment and condensed above the equipment, and the solvent then flows downwardly through the equipment, whereby the said coagulum is leached from the equipment.

5. A method as in claim 1, in which the pro-oxidant is phenylhydrazine.

6. A method as in claim 1, in which the solvent is employed in the form of an aqueous emulsion.

7. A method of cleaning a vertical packed tower used in the treatment of rubber latex to remove therefrom accumulated deposits of gelled rubber coagulum, said tower containing a liquid inlet line at its upper portion and a liquid outlet line at its lower portion, and the upper and lower portions of the tower being interconnected by an air by-pass line in parallel with the tower, comprising providing a cleaning liquid comprising a rubber solvent containing from 0.5 to 5% of a pro-oxidant, heating the cleaning liquid to a temperature of from 40° to 200° C., pumping the thus-heated cleaning liquid into the top of the tower and flowing it down through the tower to leach the coagulum contained therein, removing the liquid from the bottom of the tower, and recirculating the liquid to the top of the tower again, the downward flow of cleaning liquid in the tower causing air to circulate continually down through the tower and up through said parallel air by-pass line, and continuing the said circulation of heated cleaning liquid and air until the tower is substantially cleared of rubber coagulum.

8. A method as in claim 7, in which the cleaning liquid is an aqueous emulsion in which the said solvent amounts to from 5% to 50%, and the cleaning liquid, after passing out of the bottom of the tower, is passed into a settling vessel in which particles of coagulum separate out, after which the thus-cleaned liquid is recirculated through the tower.

9. In a method of continuously deammoniating rubber latex in which the latex is passed downwardly through a vertical packed tower while a deammoniating gas is passed countercurrently upwardly and in which the tower becomes fouled after a period of operation with large volumes of soft, buttery deposits and smaller volumes of tougher, gelled rubber coagulum, the improvement comprising the steps of interrupting the said deammoniation periodically and flowing an aqueous alkaline solution through the tower to remove the buttery deposits, and interrupting the deammoniation at less frequent intervals to circulate through the tower a cleaning liquid comprising a rubber solvent containing from 0.5 to 5% of a pro-oxidant softener for rubber and from 0.01 to 2% of a peroxy compound, the said cleaning liquid being heated to a temperature of from 40° to 200° C., whereby the gelled coagulum is removed from the tower.

References Cited in the file of this patent

UNITED STATES PATENTS

| | | |
|---|---|---|
| 2,052,997 | Bezzenberger | Sept. 1, 1936 |
| 2,069,151 | Ioannu | Jan. 26, 1937 |

FOREIGN PATENTS

| | | |
|---|---|---|
| 575,284 | Great Britain | Feb. 12, 1946 |